United States Patent
Krüger et al.

(10) Patent No.: US 12,336,655 B2
(45) Date of Patent: Jun. 24, 2025

(54) SINGLE-SERVE CAPSULE FOR PREPARING A BEVERAGE IN A BEVERAGE PREPARATION MACHINE, AND SYSTEM FOR PREPARING A BEVERAGE FROM SAID SINGLE-SERVE CAPSULE

(71) Applicant: GCS GERMAN CAPSULE SOLUTION GMBH, Bergisch Gladbach (DE)

(72) Inventors: Marc Krüger, Bergisch Gladbach (DE); Günter Empl, Bergisch Gladbach (DE)

(73) Assignee: GCS GERMAN CAPSULE SOLUTION GMBH, Bergisch Gladbach (DE)

( * ) Notice: Subject to any disclaimer, the term of this patent is extended or adjusted under 35 U.S.C. 154(b) by 829 days.

(21) Appl. No.: 17/428,836

(22) PCT Filed: Feb. 13, 2020

(86) PCT No.: PCT/EP2020/053678
§ 371 (c)(1),
(2) Date: Aug. 5, 2021

(87) PCT Pub. No.: WO2020/165303
PCT Pub. Date: Aug. 20, 2020

(65) Prior Publication Data
US 2022/0127071 A1    Apr. 28, 2022

(30) Foreign Application Priority Data

Feb. 13, 2019  (DE) .......................... 102019201904.8
May 23, 2019  (DE) .......................... 102019207557.6

(51) Int. Cl.
*A47J 31/36*    (2006.01)
*A47J 31/40*    (2006.01)

(52) U.S. Cl.
CPC .......... *A47J 31/407* (2013.01); *A47J 31/3623* (2013.01); *A47J 31/3676* (2013.01); *A47J 31/369* (2013.01)

(58) Field of Classification Search
CPC .. A47J 31/369; A47J 31/3676; A47J 31/3623; A47J 31/3628; A47J 31/3695; A47J 31/407; B65D 85/8046
See application file for complete search history.

(56) References Cited

U.S. PATENT DOCUMENTS

2011/0041702 A1* 2/2011 Yoakim ................ B65D 65/466
                                                              99/302 R
2015/0201792 A1* 7/2015 Doglioni Majer . B65D 85/8046
                                                              220/660

(Continued)

FOREIGN PATENT DOCUMENTS

EP    1654966 A1    5/2004
EP    1839543 A1    10/2007

(Continued)

OTHER PUBLICATIONS

Japanese Office Action dated Aug. 8, 2023, for Japanese Application 2021-543481.

(Continued)

*Primary Examiner* — Reginald Alexander
(74) *Attorney, Agent, or Firm* — The Dobrusin Law Firm, P.C.

(57) ABSTRACT

The invention relates to a single-serve capsule (1) for preparing a beverage in a beverage preparation machine, wherein: the single-serve capsule (1) comprises a base element (2), which has a cavity (3) for receiving a beverage raw material, and a capsule cover (4) sealing the cavity (3); the base element (2) comprises a capsule base (5), a peripheral flange (6), and a capsule wall (7) extending between the capsule base (5) and the peripheral flange (6); the capsule (Continued)

cover (4) is attached to the flange (6) along a sealing plane (8); the flange (6) has a peripheral bulge (9) at its outer free end; a sealing element in the form of a sealing bead (10) pointing away from the capsule cover (4) is provided on the flange (6); the sealing plane (8) extends along the flange (6) on the side of the capsule cover (4), between the bulge (9) and the sealing bead (10); and the sealing bead (10) comprises an inner flank (11) on the capsule wall (7) side and an outer flank (12) on the bulge (9) side; characterised in that the outer flank (12) is oriented at a substantially right angle ($\alpha$) to the sealing plane and the inner flank (11) is oriented at an angle ($\beta$) of greater than 80 to less than 90 degrees to the sealing plane (8).

27 Claims, 3 Drawing Sheets

(56) References Cited

U.S. PATENT DOCUMENTS

| | | | |
|---|---|---|---|
| 2016/0159563 A1 | 6/2016 | Bartoli et al. | |
| 2017/0247179 A1 | 8/2017 | Rubinstein | |
| 2018/0148251 A1* | 5/2018 | Kay | A47J 31/04 |
| 2018/0290824 A1 | 10/2018 | Dijkstra et al. | |
| 2020/0047987 A1 | 2/2020 | Kamerbeek et al. | |

FOREIGN PATENT DOCUMENTS

| | | |
|---|---|---|
| EP | 2872421 A2 | 5/2015 |
| JP | 2016-532484 A | 10/2016 |
| JP | 2018-519014 A | 7/2018 |
| JP | 2018-519014 A5 | 7/2018 |
| WO | 2014/184653 A1 | 11/2014 |
| WO | 2016/041596 A1 | 3/2016 |
| WO | 2016/075319 A1 | 5/2016 |
| WO | 2016/186488 A1 | 11/2016 |
| WO | 2016/186491 A1 | 11/2016 |
| WO | 2018/067009 A1 | 4/2018 |
| WO | 2018/185058 A1 | 10/2018 |
| WO | 2019/149875 A2 | 8/2019 |

OTHER PUBLICATIONS

Japanese Office Action dated Aug. 1, 2023, for Japanese Application 2021-543483.
International Search Report and Written Opinion for International Application PCT/EP2020/053677, dated May 26, 2020.
International Search Report and Written Opinion for International Application PCT/EP2020/053678, dated May 26, 2020.
English Translation of Chinese First Office Action, dated Jul. 7, 2022, for Chinese Application No. 202080013814.2.
Non-Final Office Action dated Apr. 11, 2024, for U.S. Appl. No. 17/428,470.

* cited by examiner

SINGLE-SERVE CAPSULE FOR PREPARING A BEVERAGE IN A BEVERAGE PREPARATION MACHINE, AND SYSTEM FOR PREPARING A BEVERAGE FROM SAID SINGLE-SERVE CAPSULE

PRIOR ART

The present invention proceeds from a portion capsule (1) for preparing a beverage in a beverage preparation machine, wherein the portion capsule (1) has a base element (2) with a cavity (3) for receiving a beverage raw material and has a capsule lid (4) which closes the cavity (3), wherein the base element (2) comprises a capsule base, an encircling flange and a capsule wall which extends between the capsule base and the encircling flange, wherein the capsule lid (4) is attached to a sealing surface on the flange (7), wherein the flange has an encircling bead at its outer free end, wherein a sealing element in the form of a sealing embossment which points away from the capsule lid is provided on the flange (7), wherein a sealing plane, on which the capsule lid is fixedly sealed, extends on the flange on the side of the capsule lid between the bead and the sealing embossment, and wherein the sealing embossment comprises an inner flank at the side of the capsule wall and an outer flank at the side of the bead.

Such portion capsules are known from the prior art. For example, the document WO 2016/186 488 A1 discloses such a generic portion capsule. This portion capsule is provided for being inserted into a brewing chamber, in which the capsule base is perforated in order to introduce brewing liquid in the form of hot water under pressure into the cavity. This increases the pressure within the portion capsule, whereby the capsule lid is pressed against a relief or pyramid plate in the brewing chamber and is perforated at the contact points when a predetermined pressure is reached. The beverage produced as a result of interaction between the introduced water and the beverage raw material, in particular roast and ground coffee, then exits the capsule through these perforation points in the lid foil.

All such portion capsules have in common the fact that a sufficient seal between the brewing chamber and the portion capsule in the region of the capsule flange is necessary in order that the water within the brewing chamber flows through the bed of beverage raw material to form the beverage and does not flow outside the portion capsule, that is to say between a wall of the brewing chamber and the outer side of the capsule wall, past the beverage raw material.

For this purpose, these types of portion capsules have, in the region of their flange, a sealing element which seals against a brewing chamber element in the brewing chamber. It is desirable here that the sealing element is composed of the same material as the capsule body (also referred to as base element) in order to keep the manufacturing costs for the portion capsule low and to facilitate the disposal or recycling of portion capsules that have already been used.

In FIG. 4H of the document WO 2016/186 488 A1, a stamped sealing embossment is disclosed as a sealing element in the flange region of the portion capsule, which sealing embossment has a vertical outer flank and an inclined inner flank. The aim of said application is that of improving the sealing action. The core concept here is that of using a sealing embossment which is as easily deformable as possible and which, as the brewing chamber is closed, is plastically deformed under the pressure of the brewing chamber element and thus abuts closely against the contour of the brewing chamber element in order to improve the sealing action. In order to facilitate this deformation, the inner flank should have an angle of 20 to 60 degrees and preferably of 30 to 50 degrees with respect to the flange plane. The inner flank thus runs in relatively flat form in order to ensure easy deformability.

A similar portion capsule is known from the document WO 2016/041 596 A1. Here, too, the portion capsule has a stamped sealing embossment in its flange. Here, too, it is the intention for the sealing action between the sealing embossment and the brewing chamber element to be attained by way of a simple deformation of the sealing embossment, for which reason the inner flank of the sealing embossment should in turn have as shallow an angle as possible, which is particularly preferably less than 50 degrees with respect to the flange plane.

A person skilled in the art is familiar with a further portion capsule with an encircling sealing element from the document EP 2 872 421 A1. In this solution, it is the intention for both flanks of the sealing element to have an angle, wherein the inner flank should again have as shallow an angle as possible of between 40 and 80 degrees with respect to the flange plane. It is even explicitly disclosed that, proceeding from an angle of 80 degrees, the flank would become "too vertical" to still be able to achieve a seal between the brewing chamber element and the flange, because this sealing element is also based on the fact that it is deformed (by 20 to 30%) by the brewing chamber element.

The aforementioned portion capsules all have in common the fact that the sealing action of their sealing elements is in each case based on a deformation of said sealing elements. For this purpose, inner flanks with as shallow an angle as possible are used in order that, as the brewing chamber is closed, the brewing chamber element can act on the flank and thus leads to a slight deformation of the sealing element.

A disadvantage of a sealing solution based on a deformation of the sealing element is that significantly increased forces are thereby required to close the brewing chamber. The ease of use and the longevity of the beverage preparation machine are thus considerably reduced.

An alternative would be separate sealing elements composed of a sealing material, such as are known from the documents EP 1 654 966 A1 and EP 1 839 543 A1. However, such sealing elements have the disadvantage already mentioned above that, owing to the use of separate materials, both the manufacturing costs for the portion capsules are significantly higher and the disposal or recycling of portion capsules that have already been used is more difficult because the different materials have to be separated from one another.

DISCLOSURE OF THE INVENTION

It is an object of the present invention to provide a portion capsule of the type mentioned in the introduction which does not have the problems outlined in conjunction with the prior art. In particular, it is the intention to provide a portion capsule which allows an improved sealing action between the flange and the brewing chamber element, without the need for significantly increased forces as the brewing chamber is closed or for separate materials to realize the sealing action.

The object of the present invention is achieved by means of a portion capsule for preparing a beverage in a brewing chamber of a beverage preparation machine, wherein the portion capsule has a base element with a cavity for receiving a beverage raw material and has a capsule lid which closes the cavity, wherein the base element comprises a capsule base, an encircling flange and a capsule wall which extends between the capsule base and the encircling flange, wherein the capsule lid is attached to a sealing plane on the flange, wherein the flange has an encircling bead at its outer free end, wherein a sealing element in the form of a sealing embossment pointing away from the capsule lid is provided on the flange, wherein the sealing plane extends on the flange on the side of the capsule lid between the bead and the sealing embossment, wherein the sealing embossment comprises an inner flank at the side of the capsule wall and an outer flank at the side of the bead, wherein the outer flank is oriented at a substantially right angle with respect to the sealing plane and wherein the inner flank is oriented at an angle of greater than 80 to less than 90 degrees with respect to the sealing plane.

The portion capsule according to the invention has the advantage over the prior art that the angle of the inner flank lies between 80 and 90 degrees. The angle is thus significantly steeper than in the case of the angles known from the prior art. This has the effect that the sealing embossment is not deformed at all, or is almost not deformed, as the brewing chamber is closed and as the portion capsule is brewed, but the desired sealing action is achieved by close areal abutment or punctiform contact between the inner flank and the brewing chamber element. For a person skilled in the art, it was surprising and not to be expected that a departure from the sealing elements well-known from the prior art, all of which are based on the slightest possible deformation of the sealing element, to a sealing embossment that does not or almost does not deform owing to its steep flanks, achieves the desired result of high leak-tightness. Furthermore, this solution generally does not require any additionally increased closing forces, because no deformation has to be effected. The inner flank has in particular an angle of 81 to 89 degrees, preferably 82 to 88 degrees, particularly preferably of 83 to 85 degrees and very particularly preferably of substantially 84 degrees with respect to the sealing plane. It has been found that, in this angle range, on the one hand, the deformation of the sealing embossment can be prevented because the angle is as steep as possible and the sealing embossment thus ensures high stability with respect to forces acting on the sealing embossment perpendicular to the sealing plane (also referred to as vertical direction Y) and, on the other hand, simple and inexpensive production of the portion capsule is made possible because the angle is always smaller than a right angle. In the case of a right angle at both flanks of the sealing embossment, the inner flank and the outer flank, the demolding of the portion capsule from the molding or stamping tool during the production of the portion capsule would be significantly more difficult. Where it is stated in the context of the present invention that the sealing embossment does not deform, almost does not deform or deforms only to a certain degree, then this statement, considered in the circumferential direction, does not necessarily refer to the entire circumference of the encircling sealing embossment. The advantages of the present invention can already be achieved if a relatively large circular segment of the encircling sealing embossment exhibits no deformation or only the reduced deformation. This applies all the more since, in the case of some brewing chamber elements, an additional web segment is formed over a small partial circular segment of the sealing contour that is in contact with the flange. Deformations of the sealing embossment can nevertheless occur in said region. Here, this however then involves only a small subsegment, which typically makes up less than 30%, preferably less than 20% and particularly preferably less than 10% of the total circumference of the sealing embossment.

A further subject matter of the present invention, or a refinement of the portion capsule according to the invention described above, is a portion capsule for preparing a beverage in a brewing chamber of a beverage preparation machine, wherein the portion capsule has a base element with a cavity for receiving a beverage raw material and has a capsule lid which closes the cavity, wherein the base element comprises a capsule base, an encircling flange and a capsule wall which extends between the capsule base and the encircling flange, wherein the capsule lid is attached to a sealing plane on the flange, wherein the flange has an encircling bead at its outer free end, wherein a sealing element in the form of a sealing embossment pointing away from the capsule lid is provided on the flange, wherein the sealing plane extends on the flange on the side of the capsule lid between the bead and the sealing embossment, wherein the sealing embossment comprises an inner flank at the side of the capsule wall and an outer flank at the side of the bead, wherein the sealing embossment is designed such that, as the brewing chamber is closed, said sealing embossment is not deformed or is deformed only by a maximum of 30%, preferably by a maximum of 20%, particularly preferably by a maximum of 10% and very particularly preferably by a maximum of 5% of its total height perpendicular to the sealing plane.

It has already been stated that, despite the avoidance of a significant deformation of the sealing embossment as the brewing chamber is closed and as the portion capsule is brewed, the desired sealing action is advantageously achieved by close areal abutment or punctiform contact between the inner flank and the brewing chamber element. For a person skilled in the art, it was surprising and not to be expected that a departure from the sealing elements well-known from the prior art, all of which are based on the slightest possible deformation of the sealing element, to a sealing embossment that does not or almost does not deform owing to its steep flanks, achieves the desired result of high leak-tightness. Furthermore, this solution does not require any high closing forces, because no deformation has to be effected. In particular, the sealing embossment is designed such that, in the event of an exertion of force of up to 100 N on the sealing embossment perpendicular to the sealing plane, said sealing embossment is not deformed or is deformed only by a maximum of 30%, preferably by a maximum of 20%, particularly preferably by a maximum of 10% and very particularly preferably by a maximum of 5% of its height perpendicular to the sealing plane. In the case of the present invention, the sealing embossment is thus of such rigid and stable form that, in the event of an exertion of force of up to 100 N centrally on the sealing embossment perpendicular to the sealing plane, that is to say along the vertical direction, which force in particular acts in a planar manner on the tip of the sealing embossment or on a flank region of the sealing embossment or on a planar transition plane of the sealing embossment, no significant deformation of the sealing embossment occurs. Here, the height of the sealing embossment should be able to be changed in particular by a maximum of 30%, preferably by a maximum of 20%, particularly preferably by a maximum of 10% and very particularly preferably by a maximum of 5%. It is furthermore conceivable that no lateral displacement or deformation occurs along a direction parallel to the sealing plane, that is to say in the radial direction R as viewed from the central longitudinal axis of the concentrically formed portion capsule. Here, too, it is provided that the tip of the sealing embossment, that is to say the transition region of the sealing embossment, is displaced or deformed by a maximum of 30%, preferably by a maximum of 20%, particularly preferably by a maximum of 10% and very particularly preferably by a maximum of 5%, of the width of the sealing embossment at the middle of its height in the radial direction.

Where it is stated in the context of the present invention that the sealing embossment does not deform, almost does not deform or deforms only to a certain degree, then this statement, considered in the circumferential direction, does not necessarily refer to the entire circumference of the encircling sealing embossment. The advantages of the present invention can already be achieved if a relatively large circular segment of the encircling sealing embossment exhibits no deformation or only the reduced deformation. This applies all the more since, in the case of some brewing chamber elements, an additional web segment is formed over a small partial circular segment of the sealing contour that is in contact with the flange. Deformations of the sealing embossment can nevertheless occur in said region. Here, this however then involves only a small subsegment, which typically makes up less than 30%, preferably less than 20% and particularly preferably less than 10% of the total circumference of the sealing embossment.

Advantageous configurations and refinements of the invention can be found in the subclaims and in the following description with reference to the drawings. These advantageous configurations and refinements thus relate equally to both portion capsules according to the invention described above.

According to a preferred embodiment of the present invention, it is provided that a transition region extends between the inner flank and the outer flank, wherein, preferably, the transition region is of curved form or has a transition plane which extends parallel to the sealing plane. The curved form of the transition region has the advantage that the sealing embossment gains stability, and thus a deformation can be prevented even more effectively. On the other hand, the planar form of the transition region has the advantage that the sealing embossment is flatter and thus engages to a lesser extent into the depression of the sealing contour of the receiving element of the brewing chamber, such that less force is exerted on the sealing embossment as the brewing chamber is closed. It is preferably thus the case that, in the radial cross section of the encircling sealing embossment, the inner flank has a rectilinear contact region which extends between the flange and the transition region. The term "in radial cross section" means that a view is directed to a sectional illustration of the flange contour along the circumferential direction of the encircling flange contour. The plane of the sectional illustration is accordingly spanned by the vertical direction and the radial direction, as illustrated in FIGS. 3 to 5.

According to a preferred embodiment of the present invention, it is provided that the rectilinear contact region has a length of 0.1 to 1.5 millimeters, preferably of 0.1 to 0.8 millimeters, particularly preferably of 0.15 to 0.55 millimeters and very particularly preferably of 0.2 to 0.4 millimeters. It has been found in simulations and experiments that an optimal seal between the sealing contour of the brewing chamber element and the flange can be achieved with a rectilinear contact region of the stated lengths. In other words: Positively locking and non-positively locking planar abutment of the inner flank against a sealing lug flank of the sealing contour of the brewing chamber element over a length of 0.1 to 1.5 millimeters, preferably 0.1 to 0.8 millimeters, particularly preferably 0.15 to 0 55 millimeters and very particularly preferably of 0.2 to 0.4 millimeters, is sufficient to achieve a sufficient sealing action without the need for any significant deformation of the sealing embossment by the sealing contour.

According to a preferred embodiment of the present invention, it is provided that the portion capsule has a radius of 0.05 to 0.5 millimeters, preferably of 0.1 to 0.3 millimeters and particularly preferably of 0.1 to 0.2 in the transition from the rectilinear contact region to the transition region. According to a preferred embodiment of the present invention, it is provided that the portion capsule has a radius of 0.05 to 0.5 millimeters, preferably of 0.1 to 0.3 millimeters and particularly preferably of 0.1 to 0.2 in the transition from the outer flank to the transition region. According to a preferred embodiment of the present invention, it is provided that the height of the sealing embossment perpendicular to the sealing plane ranges between 0.2 and 1 millimeter, preferably between 0.3 and 0.6 millimeters and particularly preferably between 0.4 and 0.5 millimeters. The preferred dimensioning of the sealing embossment described above has the effect that the sealing embossment has sufficient stability in order that no deformation thereof occurs as the brewing chamber is closed and/or as the capsule is brewed in the brewing chamber.

According to a preferred embodiment of the present invention, it is provided that, the sealing embossment is configured such that, in the event of an exertion of force of up to 100 N on the sealing embossment perpendicular to the sealing plane, said sealing embossment is not deformed or is deformed only by a maximum of 0.2 millimeters, preferably by a maximum of 0.15 millimeters, particularly preferably by a maximum of 0.1 millimeters and very particularly preferably by a maximum of 0.05 millimeters of its height perpendicular to the sealing plane. In the case of the present invention, the sealing embossment is thus of such rigid and stable form that, in the event of an exertion of force of up to 100 N centrally on the sealing embossment perpendicular to the sealing plane, that is to say along the vertical direction, which force in particular acts in a planar manner on the tip of the sealing embossment or on a flank region of the sealing embossment or on a planar transition plane of the sealing embossment, no significant deformation of the sealing embossment occurs. Here, the height of the sealing embossment should be able to be changed in particular by a maximum of 0.2 millimeters, preferably by a maximum of 0.15 millimeters, particularly preferably by a maximum of 0.1 millimeters and very particularly preferably by a maximum of 0.05 millimeters. It is furthermore conceivable that no lateral displacement or deformation occurs along a direction parallel to the sealing plane, that is to say in the radial direction R as viewed from the central longitudinal axis of the concentrically formed portion capsule. Here, too, it is provided that the tip of the sealing embossment, that is to say the transition region of the sealing embossment, is displaced or deformed in a radial direction by a maximum of 0.2 millimeters, preferably by a maximum of 0.15 millimeters, particularly preferably by a maximum of 0.1 millimeters and very particularly preferably by a maximum of 0.05 millimeters.

According to a preferred embodiment of the present invention, it is provided that the sealing embossment, at the middle of its height, has a width between 0.2 and 1 millimeter, preferably between 0.3 and 0.8 millimeters and particularly preferably between 0.4 and 0.6 millimeters. According to a preferred embodiment of the present invention, it is provided that the sealing embossment has an average material thickness between 0.05 and 0.3 millimeters, preferably between 0.08 and 1.8 millimeters, particularly preferably between 0.09 and 1.5 millimeters and very particularly preferably of substantially 0.11 millimeters. According to a preferred embodiment of the present invention, it is provided that, in the radial cross section of the encircling sealing embossment, the transition region has a rectilinear connecting region which has a width of between 0.3 and 1.2 millimeters, preferably between 0.3 to 1.0 millimeters and particularly preferably between 0.6 and 0.8 millimeters. According to a preferred embodiment of the present invention, it is provided that the portion capsule has a radius of 0.05 to 0.5 millimeters, preferably of 0.1 to 0.3 millimeters and particularly preferably of 0.1 to 0.2 in the transition from the outer flank to the flange region running parallel to the sealing plane. This radius may refer to either the top side of the flange or the bottom side of the flange. The preferred dimensioning of the sealing embossment described above has the effect that the sealing embossment has sufficient stability in order that no deformation thereof occurs as the brewing chamber is closed and/or as the capsule is brewed in the brewing chamber.

According to a preferred embodiment of the present invention, it is provided that the portion capsule has a flange region, which extends parallel to the sealing plane, between the bead and the outer flank, and wherein the portion capsule has a flange intermediate region which extends between the inner flank and the capsule wall, wherein the flange region and the flange intermediate region are situated at the same height along a vertical direction perpendicular to the sealing plane. This has the advantage that, as the brewing chamber is closed, no indirect displacement or deformation of the sealing embossment occurs by virtue of the flange intermediate region or the flange region being deformed or displaced relative to one another in the vertical direction. Instead, both the flange intermediate region and the flange region can be supported on the closure element of the brewing chamber and thus build up a suitable counterforce to prevent significant deformation of the sealing embossment. It is conceivable that the lid foil is sealed or adhesively bonded on the flange in each case both in the flange intermediate region and in the flange region.

According to a preferred embodiment of the present invention, it is provided that the portion capsule has a radius of 0.08 to 0.5 millimeters, preferably of 0.1 to 0.3 millimeters and particularly preferably of substantially 0.2 in the transition from the inner flank to a flange intermediate region which extends between the sealing embossment and the capsule wall. This radius may refer to either the top side of the flange or the bottom side of the flange.

According to a preferred embodiment of the present invention, it is provided that the portion capsule has a flange intermediate region which extends between the inner flank and the capsule wall, wherein the flange intermediate region is curved. A curved flange intermediate region is preferably more dimensionally stable than a planar flange intermediate region. The apex of the curved flange intermediate region preferably lies at the same height as the flange region along a vertical direction perpendicular to the sealing plane, such that both the flange intermediate region and the flange region are nevertheless supported on the closure element of the brewing chamber. Preferably, the curvature of the flange intermediate region has a radius between 0.1 and 1 millimeter, preferably between 0.3 and 0.8 millimeters and very particularly preferably between 0.4 and 0.6 millimeters. This radius may refer to either the top side of the flange or the bottom side of the flange.

According to a preferred embodiment of the present invention, it is provided that, in the radial cross section of the sealing embossment, the outer flank has a rectilinear flank section which comprises a length between 0.2 and 1 millimeter, preferably between 0.3 and 0.6 millimeters and particularly preferably between 0.4 and 0.5 millimeters. According to a preferred embodiment of the present invention, it is provided that, in the radial cross section, the extent of the sealing plane between the outer flank and the bead comprises a length between 0.3 and 1.5 millimeters, preferably between 0.5 and 1.2 millimeters and particularly preferably between 0.7 and 0.9 millimeters.

According to a preferred embodiment of the present invention, it is provided that the bead protrudes over the flange over a top side which forms the sealing plane. The bead preferably protrudes from the flange over a bottom side which faces away from the sealing plane, wherein the flange, on the bottom side, projects from the flange to a lesser extent than the sealing embossment, and/or wherein the bead protrudes over the flange to a lesser extent on the top side than on the bottom side. The bead is formed in particular by rolling-up of the flange edge, wherein the flange edge is preferably rolled up in the direction of the capsule base.

According to a preferred embodiment of the present invention, it is provided that the base element is manufactured in one piece from aluminum. The base element is preferably produced by cold or hot forming, in particular deep drawing, in the case of which the sealing embossment is integrally stamped into the flange. The portion capsule is preferably of frustoconical or cylindrical form. The cavity formed by the base element serves for receiving beverage raw material, for example roasted coffee granules, instant coffee, chocolate powder, tea cuttings, milk powder and/or the like.

A further subject matter of the present invention is a system for preparing a beverage, having a beverage preparation machine and the portion capsule according to the invention, wherein the beverage preparation machine has a brewing unit with a first brewing chamber part and a second brewing chamber part, wherein the first and/or the second brewing chamber part is movable relative to the other brewing chamber part between an approximated position, in which the first and the second brewing chamber part form a closed brewing chamber, and an open position, in which the first and the second brewing chamber part are spaced apart for the insertion or ejection of a portion capsule, wherein the first brewing chamber part comprises a receiving element for partially receiving the portion capsule and the second brewing chamber part comprises a closure element for the receiving element, wherein, in the closed position, the flange of the portion capsule is received in positively locking and sealing fashion between an edge region of the receiving element and the closure element.

The portion capsule according to the invention is part of the system according to the invention, for which reason all of the advantages and refinements discussed in conjunction with the portion capsule also apply equally to the system according to the invention.

According to a preferred embodiment of the present invention, it is provided that, in the edge region, there is formed a sealing contour for sealing engagement with the sealing embossment, wherein the sealing contour comprises an encircling depression and an encircling sealing lug formed adjacent to the depression, wherein the depression is preferably arranged outside the sealing lug in a radial direction, and wherein an outer sealing lug flank forms an inner wall of the depression. In particular, in the closed position, the sealing lug engages into the flange intermediate region and the sealing embossment engages into the depression such that the sealing lug flank together with the inner flank form linear or punctiform contact in radial cross section.

According to a preferred embodiment of the present invention, it is provided that, in the closed position, the sealing embossment is not deformed or is deformed by the sealing contour only by a maximum of 30%, preferably by a maximum of 20%, particularly preferably by a maximum of 10% and very particularly preferably by a maximum of 5% of its height perpendicular to the sealing plane.

According to a preferred embodiment of the present invention, it is provided that the sealing contour has a further encircling sealing lug, wherein the depression is arranged between the sealing lug and the further sealing lug in the radial direction, wherein the sealing lug is formed so as to be longer than the further sealing lug, and wherein, in the closed position, the further sealing lug forms punctiform contact with the outer flank in radial cross section.

Further details, features and advantages of the invention will emerge from the drawings and from the following description of preferred embodiments with reference to the drawings. Here, the drawings merely illustrate exemplary embodiments of the invention, which do not restrict the essential inventive concept.

EMBODIMENTS OF THE INVENTION

Figure 1:
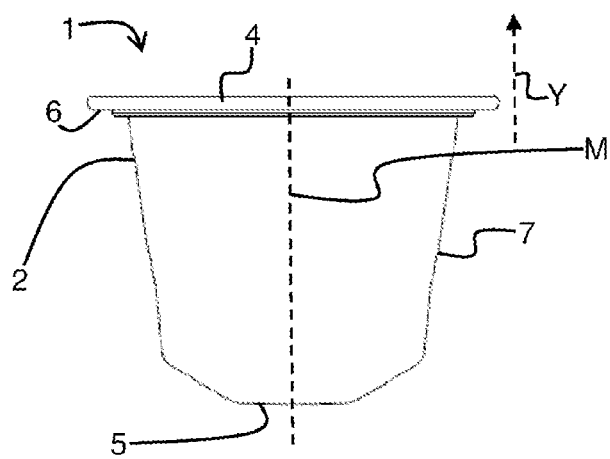
FIG. 1 shows a schematic sectional view of a portion capsule according to an exemplary embodiment of the present invention.
Figure 2:
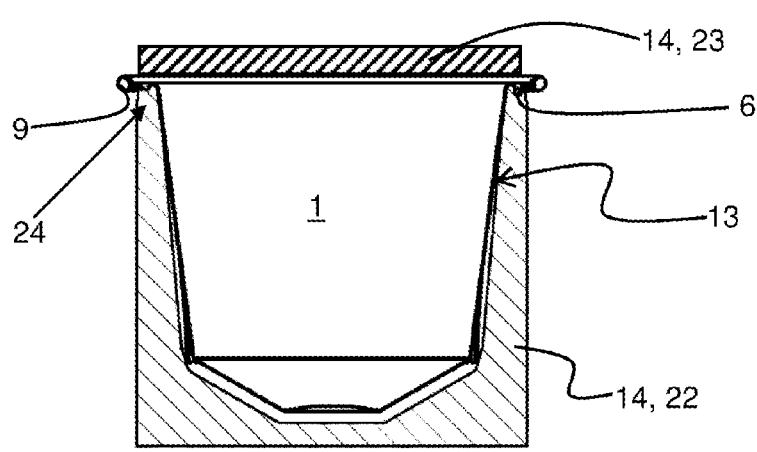
FIG. 2 shows a schematic view of the portion capsule according to a further exemplary embodiment of the present invention.

FIGS. 1 and 2 illustrate a schematic side view of a portion capsule 1 and a sectional view of a system composed of the portion capsule 1 and of a part of a beverage preparation machine 14 for preparing a beverage according to an exemplary first embodiment of the present invention.

The portion capsule 1 has a for example cup-shaped and frustoconical base element 2, which has a capsule base 5 at its closed side and an encircling flange 6 at its open side. Between the capsule base 5 and the flange 6, a capsule wall 7 extends around a cavity 3. The portion capsule 1 is of rotationally symmetrical construction about its central longitudinal axis M, which defines a vertical direction Y. In a radial direction R, the flange 6, which is circular and is thus of encircling form in a circumferential direction, protrudes outward beyond the capsule wall 7.

The flange 6 is fixedly connected to a capsule lid 4 in the form of a lid foil which closes the cavity 3 on the open side of the base element 2. For this purpose, the flange 6 has a sealing plane 8 which faces toward the capsule lid 4 and which extends approximately at right angles to the vertical direction Y. The capsule lid 4, in its edge region, is sealed, welded or adhesively bonded to the sealing plane 8.

The capsule lid 4 is preferably formed from aluminum or plastic. Formed within the base element 2 is the cavity 3, which is filled with beverage raw material, for example roasted coffee granules, instant coffee, chocolate powder, tea cuttings, milk powder and/or the like (not illustrated for the sake of clarity), and which is closed by the capsule lid 4.

The cup-shaped configuration of the base element 2 is generated preferably by thermoforming, for example deep drawing by means of negative pressure, positive pressure and/or a movable die. The base element 2 is preferably in the form of a deep-drawn aluminum part. It would alternatively also be conceivable for the base element 2 to be formed from polyethylene (PE), polypropylene (PP), polyvinyl chloride (PVC) or polyethylene terephthalate (PET). Alternatively, the portion capsule 1 is produced by means of an injection molding process, in particular in a one-component, multi-component or in-mold process.

During use, the portion capsule 1 is introduced into a brewing unit in a beverage preparation machine 14. The brewing unit comprises a first brewing chamber part and a second brewing chamber part, wherein the first and/or the second brewing chamber part is movable relative to the other brewing chamber part between an approximated position, in which the first and the second brewing chamber part form a closed brewing chamber 13, and an open position, in which the first and the second brewing chamber part are spaced apart for the insertion or ejection of a portion capsule 1.

The first brewing chamber part is in the form of a cup-shaped receiving element 22 which receives the major part of the portion capsule 1, in particular when the brewing chamber 13 is in the closed position. The second brewing chamber part is in the form of a closure element 23 for the receiving element 22. In the closed position shown in FIG. 2, the flange 6 of the portion capsule 1 is clamped sealingly between an edge region 24 of the receiving element 22 and the closure element 23.

In this closed position, the capsule lid 4 and the capsule base 5 are perforated one after the other or at the same time. Here, the one or more perforation openings in the capsule base 5 are formed in particular by one or more perforation tips on the closure element 23 during the closing of the brewing chamber 13, while the perforation openings in the capsule lid 4 are generated preferably by perforation structures in the base of the receiving element already during the closing of the brewing chamber 13 or only as a result of the pressure build-up in the interior of the portion capsule 1 during the beverage preparation process.

Extraction liquid is introduced under pressure into the cavity 3 through the one or more perforation openings in the capsule base 5. The interaction between the extraction liquid and the beverage raw material creates the desired beverage, which exits the portion capsule 1 through the perforation openings in the capsule lid 4 and is fed to a beverage container. By means of an optional filter medium, particles of the beverage raw material can be filtered out of the beverage and retained in the portion capsule 1. Preferably, however, the multiply perforated capsule lid 4 functions as a filter element.

Figure 3:
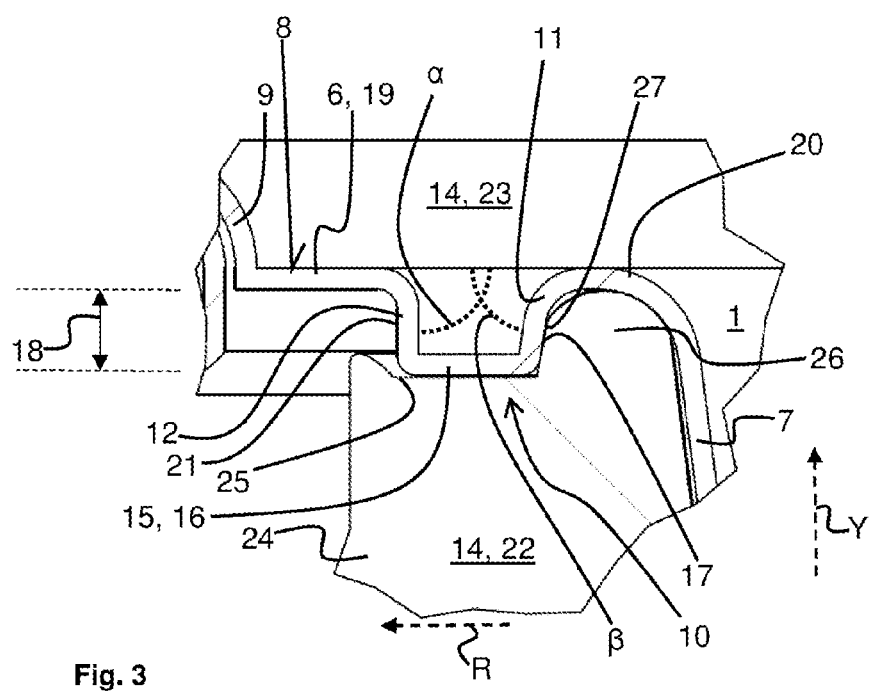
FIG. 3 shows a schematic detail view of the ring element according to an exemplary embodiment of the present invention.

FIG. 3 illustrates a detail view of the portion capsule 1 and brewing chamber 13 illustrated in FIG. 2 according to the exemplary first embodiment of the present invention. Here, FIG. 3 shows the sectional illustration of the flange 6 on the left-hand side of FIG. 2 in an enlarged illustration.

The flange 6 shown extends substantially horizontally, that is to say parallel to the radial direction R, from the upper end of the capsule wall 7 to its free outer end, at which the flange 6 terminates with a bead 9. The bead 9 comprises, in particular, a flange end rolled up in the direction of the capsule base 5.

Furthermore, the bead 9 protrudes in the vertical direction Y in particular in each case both from the flange 6 over a top side which forms the sealing plane 8 and from the flange 6 over a bottom side which faces away from the sealing plane 8, wherein the flange 6, on the bottom side, projects from the flange 6 to a lesser extent than a sealing embossment 10, and furthermore protrudes over the flange 6 to a lesser extent on the top side than on the bottom side.

Between the bead 9 and the end of the capsule wall 7, the flange 6 has the sealing embossment 10, which is in the form of a stamped indentation directed in the vertical direction Y away from the capsule lid 4 and which is of concentrically encircling form in the circumferential direction around the central longitudinal axis M. Here, the sealing embossment 10 has an inner flank 11, which faces toward the capsule wall 7, and an outer flank 12, which faces toward the bead 9.

Between the inner flank 11 and the outer flank 12, there extends a planar transition region 15 in the form of the transition plane 16, which runs in particular parallel to the sealing plane 8. Between the outer flank 12 and the bead 9, the flange 6 has a flange region 19, the top side of which forms the sealing plane 8. The outer flank 12 is formed so as to be substantially at right angles to the sealing plane 8, that is to say the outer flank runs at an angle α of approximately 90 degrees with respect to the plane of the flange region 19.

The outer flank 12 has in particular a rectilinear flank section 21, which preferably comprises a length between 0.4 and 0.5 millimeters and which runs at right angles to the flange region 19. The flange region 19 preferably has a length of 0.7 to 0.9 millimeters. The transition between flange region 19 and outer flank 12 preferably has a radius of 0.08 to 0.12 millimeters on the bottom side of flange 6, whereas the transition from the outer flank 12 to the transition plane 16 and to the transition plane 16 to the inner flank 11 on the bottom side of the flange 6 each have a radius of 0.08 to 0.12.

The flange 6 has a flange intermediate region 20 between the inner flank 11 and the upper end of the capsule wall 7. In the present example, the flange intermediate region is of curved form in radial cross section. Here, the curvature has, on the bottom side of the flange 6, in particular a radius between 0.3 and 0.5 millimeters.

The inner flank 11 has a rectilinear contact region 17 in radial cross section, that is to say the rectilinear contact region is the length of the straight line between the two turning points in the profile of the inner flank 11. In the present example, the length of the contact region 17 is 0.1 to 1.5 millimeters, preferably 0.1 to 0.8 millimeters, particularly preferably 0.15 to 0.55 millimeters and very particularly preferably 0.2 to 0.4 millimeters.

According to the invention, the angle β between the inner flank 11 or the rectilinear contact region 17 and the sealing plane 8 is greater than 80 degrees and less than 90 degrees, wherein the angle β lies in particular in an interval from 81 to 89 degrees, preferably from 82 to 88 degrees, particularly preferably from 83 to 85 degrees, and very particularly preferably of substantially 84 degrees, with respect to the sealing plane 8.

The flange region 19 and the apex of the flange intermediate region 20 lie at the same height in the vertical direction Y. The height 18 of the sealing embossment 10 corresponds to the total extent of the sealing embossment 10 from the bottom side of the flange and flange intermediate region 19, 20 to the bottom side of the flange 6 in the region of the transition plane 16. This height 18 is, perpendicular to the sealing plane 8, between 0.2 and 1 millimeter, preferably between 0.3 and 0.6 millimeters and particularly preferably between 0.4 and 0.5 millimeters.

The sealing embossment 10, at the middle of its height 18, optionally has a width between 0.2 and 1 millimeter, preferably between 0.3 and 0.8 millimeters and particularly preferably between 0.4 and 0.6 millimeters.

The material thickness of the aluminum in the region of the flange 6 is preferably between 0.1 and 0.13 millimeters.

FIG. 3 likewise illustrates the edge region 24 of the receiving element 22, which is in sealing engagement with the flange 6 of the portion capsule 1. The edge region 24 comprises a sealing contour for sealing engagement with the sealing embossment 10.

For this purpose, the sealing contour has a depression 25, which runs in encircling fashion in the circumferential direction, and a sealing lug 26, which is formed adjacent to the depression 25 and which likewise runs in encircling fashion in the circumferential direction. As viewed in the radial direction R, the depression 25 is arranged outside the sealing lug 26, such that an outer sealing lug flank 27 of the sealing lug 26 forms an inner wall of the depression 25.

In the illustrated closed position, the sealing lug 26 engages into the flange intermediate region 20, whereas the sealing embossment 10 engages into the depression 25. In this way, linear or punctiform contact 28 is formed between the sealing lug flank 27 and the inner flank 11 in radial cross section. This linear or punctiform contact 28 is present in encircling fashion in the circumferential direction and thus forms the actual seal between flange 6 and receiving element 22, such that no or scarcely any extraction liquid can flow past the beverage substance to the outlet of the brewing chamber 13.

The apex of the sealing lug 26 optionally makes contact with the bottom side of the curvature of the flange intermediate region 20, whereas the bottom side of the transition plane 16 optionally makes contact with the base of the depression 25.

The above-described design and dimensioning of the sealing embossment 10 has the effect that the sealing embossment 10 does not or almost does not deform as the brewing chamber 14 is closed and/or as the beverage is brewed. The sealing takes place primarily by way of the in particular encircling linear or punctiform contact 28.

In other words: The sealing embossment 10 is designed such that, as the brewing chamber 13 is closed and/or as the portion capsule 1 is brewed, said sealing embossment is not deformed or is deformed only by a maximum of 30%, preferably by a maximum of 20%, particularly preferably by a maximum of 10% and very particularly preferably by a maximum of 5% of its height 18 perpendicular to the sealing plane 8. In particular, the sealing embossment 10 is thus designed such that, in the event of an exertion of force of up to 100 N on the sealing embossment 10 perpendicular to the sealing plane 8, said sealing embossment is not deformed or is deformed only by a maximum of 30%, preferably by a maximum of 20%, particularly preferably by a maximum of 10% and very particularly preferably by a maximum of 5% of its height 18 perpendicular to the sealing plane 8.

As the brewing chamber 13 is closed and/or as the portion capsule 1 is brewed, the height 18 of the sealing embossment 10 should be changed in the vertical direction Y in particular by a maximum of 0.2 millimeters, preferably by a maximum of 0.15 millimeters, particularly preferably by a maximum of 0.1 millimeters and very particularly preferably by a maximum of 0.05 millimeters.

Preferably, the sealing embossment 10 is thus likewise of such rigid form that that no lateral displacement or deformation in the radial direction R occurs either. Here, too, it is provided that the tip of the sealing embossment 10, that is to say the transition region 15 of the sealing embossment 10, is displaced or deformed in a radial direction R by a maximum of 30%, preferably by a maximum of 20%, particularly preferably by a maximum of 10% and very particularly preferably by a maximum of 5%, of the width of the sealing embossment 8 at the middle of its height.

In the case of the sealing embossment 10, as the brewing chamber 13 is closed and/or as the portion capsule 1 is brewed, it is preferably provided that the tip of the sealing embossment 10, that is to say the transition region 15 of the sealing embossment 10, is displaced or deformed in a radial direction R by a maximum of 0.2 millimeters, preferably by a maximum of 0.15 millimeters, particularly preferably by a maximum of 0.1 millimeters and very particularly preferably by a maximum of 0.05 millimeters.

Figure 4:
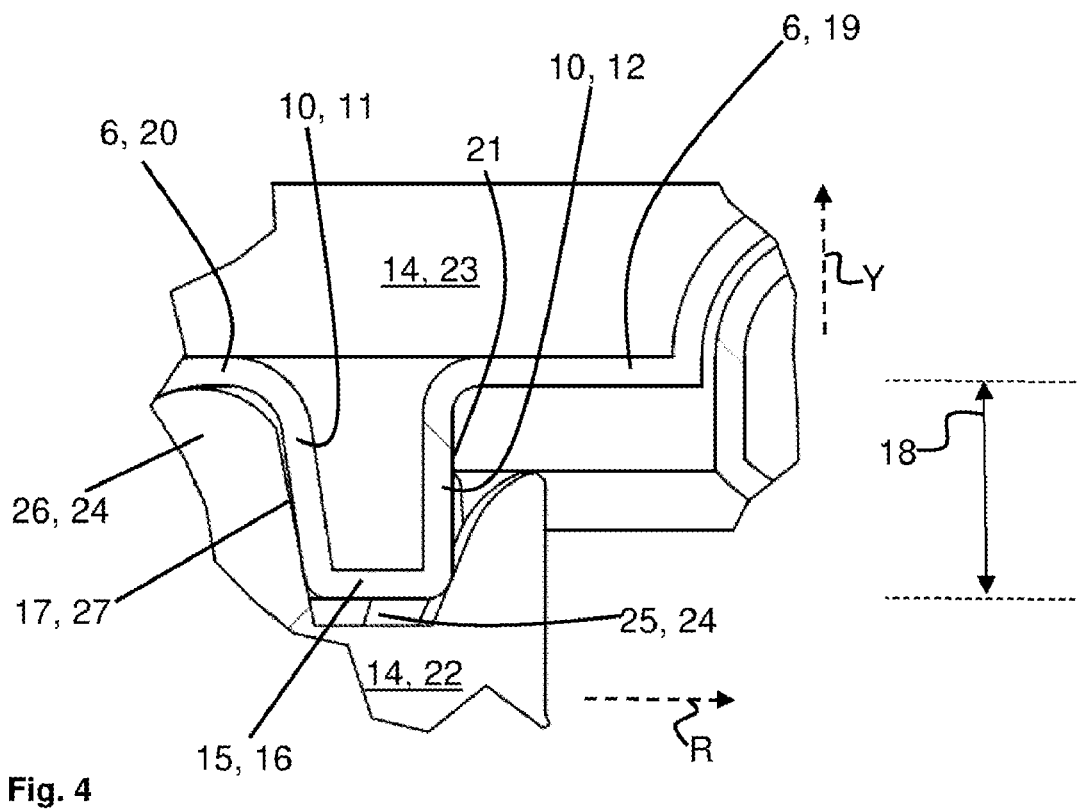
FIG. 4 shows a schematic view of the ring element according to a further exemplary embodiment of the present invention.

FIG. 4 illustrates a detail view of the portion capsule 1 and brewing chamber 13 illustrated in FIG. 2 according to an exemplary second embodiment of the present invention. Here, FIG. 4 shows the sectional illustration of the flange 6 on the right-hand side (for example of FIG. 2) in an enlarged illustration.

The second embodiment is substantially identical to the first embodiment illustrated in FIG. 3, such that all of the above explanations apply analogously.

By contrast, however, the sealing embossment 10 in the second embodiment has a height of 0.7 to 0.8 millimeters. The rectilinear contact region 17 thus extends over 0.5 to 0.6 millimeters, whilst the transition plane 16 preferably likewise comprises a width of 0.5 to 0.6 millimeters. The flange region 19 furthermore extends in particular over 0.9 to 1 millimeter.

In this example, the sealing contour has a further encircling sealing lug 28 which, in contact, in radial cross section, with the outer flank 12, forms punctiform contact. This encircling punctiform contact leads to an additional sealing action. The depression 25 is arranged between the sealing lug 26 and the further sealing lug 28 in the radial direction. The sealing lug 26 is furthermore formed so as to be longer than the further sealing lug 28 along the vertical direction Y.

It is conceivable that, in this embodiment, only a relatively large circular segment of the encircling sealing embossment 10 experiences no deformation or only the reduced deformation. This is all the more true since, in the case of some receiving elements 22, an additional web segment is formed over a small partial circular segment in the depression 25 of the sealing contour. Deformations of the sealing embossment 10 can nevertheless occur in the region of said web element. Here, this however then involves only a small subsegment of the encircling sealing embossment 10, which typically makes up less than 30%, preferably less than 20% and particularly preferably less than 10% of the total circumference of the sealing embossment 10. The remaining and thus significantly larger subsegment of the encircling sealing embossment 10 is nevertheless not deformed or is deformed only to a limited extent.

Figure 5:
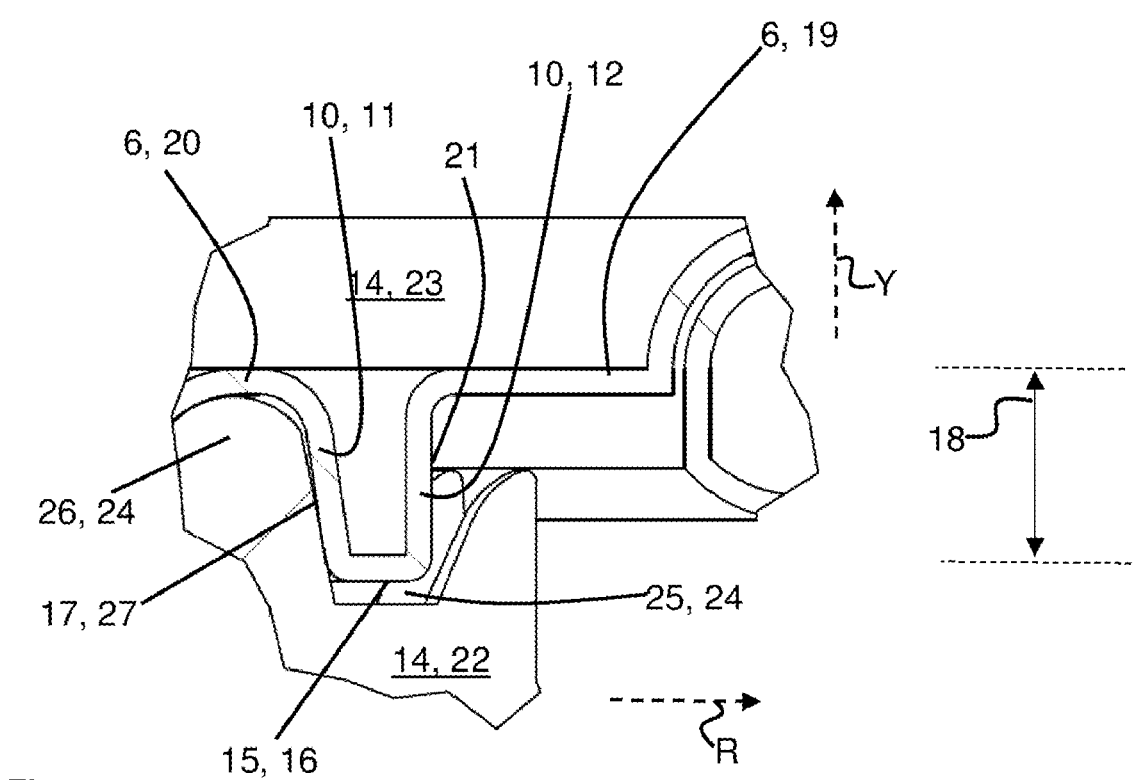
FIG. 5 shows a schematic detail view of the ring element according to the exemplary embodiment of the present invention illustrated in FIG. 4.

FIG. 5 illustrates a detail view of the portion capsule 1 and brewing chamber 13 illustrated in FIG. 2 according to an exemplary third embodiment of the present invention. Here, FIG. 4 shows the sectional illustration of the flange 6 on the right-hand side (for example of FIG. 2) in an enlarged illustration.

The third embodiment is substantially identical to the second embodiment illustrated in FIG. 4, such that all of the above explanations apply analogously.

By contrast, however, the sealing embossment 10 in the third embodiment has a height of 0.8 to 0.9 millimeters. The rectilinear contact region 17 thus extends over 0.3 to 0.5 millimeters, whilst the transition plane 16 preferably likewise comprises a width of 0.4 to 0.5 millimeters. The flange region 19 furthermore extends in particular over 1 to 1.1 millimeters.

Figure 6:
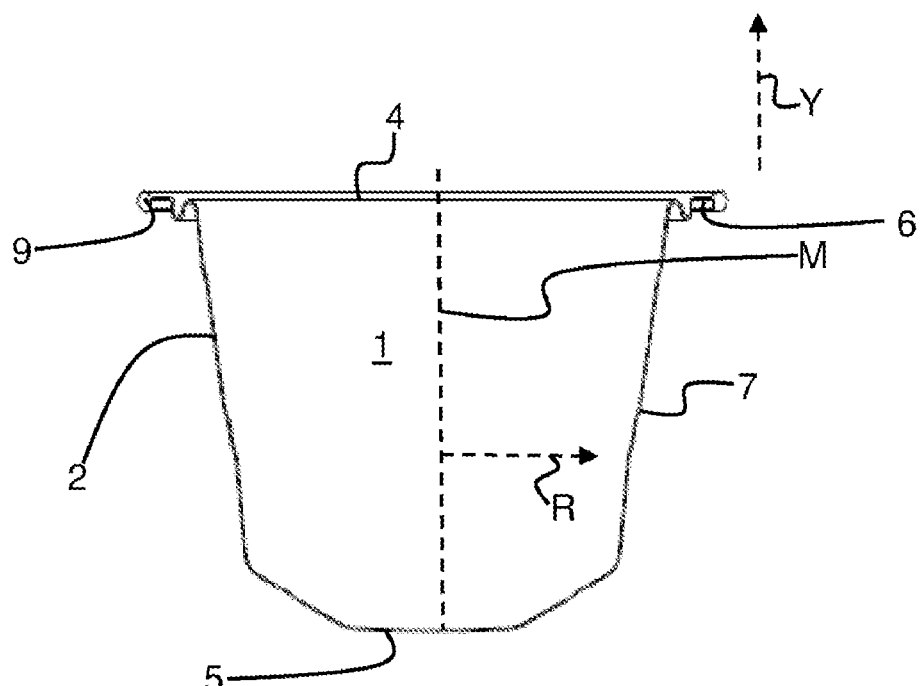
FIG. 6 shows a further schematic detail view of the ring element according to the exemplary embodiment of the present invention illustrated in FIG. 4.
Figure 7:
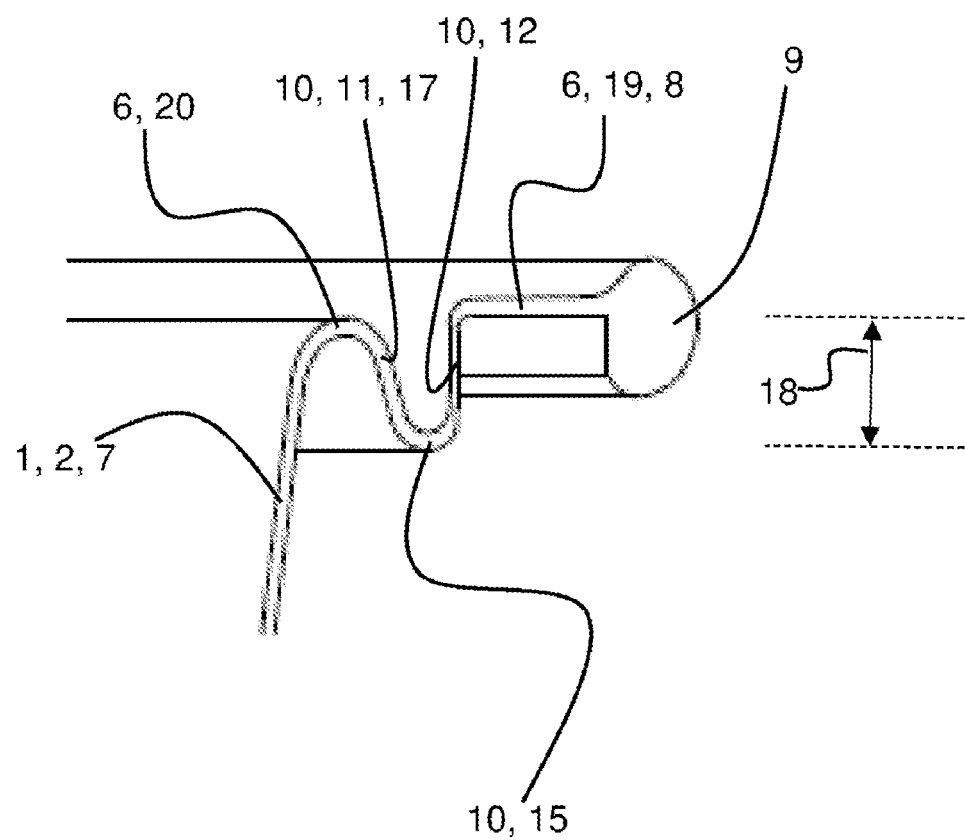
FIG. 7 shows a schematic view of the portion capsule according to a further exemplary embodiment of the present invention.

FIGS. 6 and 7 illustrate an overall view and a detail view of a portion capsule 1 according to an exemplary fourth embodiment of the present invention. Here, FIG. 7 shows the sectional illustration of the flange 6 on the right-hand side of FIG. 6 in an enlarged illustration.

The fourth embodiment is substantially identical to the second embodiment illustrated in FIG. 4, such that all of the above explanations apply analogously.

By contrast, in the fourth embodiment, the transition region 15 is formed not as a planar transition plane 16 but as a curved transition region, whereby the sealing embossment 10 is provided with even greater stability.

In the fourth embodiment, the sealing embossment 10 then has a height of 1 to 1.4 millimeters. The rectilinear contact region 17 thus extends over 0.8 to 1.2 millimeters. The width of the sealing embossment 10 at the middle of its height 18 is approximately 0.4 to 0.8 millimeters. The flange region 19 furthermore extends in particular over 1.3 to 1.5 millimeters.

LIST OF REFERENCE DESIGNATIONS

1 Portion capsule
2 Base element
3 Cavity
4 Capsule lid
5 Capsule base
6 Flange
7 Capsule wall
8 Sealing plane
9 Bead
10 Sealing embossment
11 Inner flank
12 Outer flank
13 Brewing chamber
14 Beverage preparation machine
15 Transition region
16 Transition plane
17 Contact region
18 Height of the sealing embossment
19 Flange region
20 Flange intermediate region
21 Flank section
22 Receiving element
23 Closure element
24 Edge region
25 Depression
26 Sealing lug 27 Sealing lug flank
28 Further sealing lug
α Angle
β Angle
R Radial direction
Y Vertical direction
M Central longitudinal axis

The invention claimed is:
1. A system for preparing a beverage comprising:
a) a portion capsule having:
  i) a base element with a cavity for receiving a beverage raw material, wherein the base element comprises:
    A) a capsule base;
    B) an encircling flange having an encircling bead at its outer free end; and
    C) a capsule wall extending between the capsule base and the encircling flange;
    wherein the base element is manufactured in one piece from aluminum; and
  ii) a capsule lid which closes the cavity, wherein the capsule lid is attached to a sealing plane on the encircling flange; and
b) a beverage preparation machine, wherein the beverage preparation machine has a brewing unit with:
  i) a first brewing chamber part comprising a receiving element for partially receiving the portion capsule; and
  ii) a second brewing chamber part comprising a closure element for the receiving element;
  wherein the first brewing chamber part and/or the second brewing chamber part is movable relative to the other brewing chamber part between an approximated position, in which the first brewing chamber part and the second brewing chamber part form a closed brewing chamber, and an open position, in which the first brewing chamber part and the second brewing chamber part are spaced apart for insertion or ejection of the portion capsule;
  wherein, in a closed position, the encircling flange of the portion capsule is received in positively locking and sealing fashion between an edge region of the receiving element and the closure element;
  wherein a sealing element in a form of a sealing embossment which points away from the capsule lid is provided on the encircling flange;
  wherein the sealing plane extends on the encircling flange on a side of the capsule lid between the bead and the sealing embossment;
  wherein the sealing embossment comprises an inner flank at a side of the capsule wall and an outer flank at a side of the bead;
  wherein a transition region having an upper surface and an opposing lower surface extends between the inner flank and the outer flank;
  wherein the upper surface and the opposing lower surface of the transition region each has a transition plane which extends parallel to the sealing plane; and
  wherein the sealing embossment is designed such that, as the brewing chamber is closed, the sealing embossment is deformed by a maximum of 10% perpendicularly with respect to the sealing plane.

2. The system as claimed in claim 1, wherein the sealing embossment is designed such that, as the brewing chamber is closed, the sealing embossment is deformed by a maximum of 5% perpendicularly with respect to the sealing plane.

3. The system as claimed in claim 1, wherein the sealing embossment is designed such that, in the event of an exertion of force of up to 100 N on the sealing embossment perpendicular to the sealing plane, the sealing embossment is not deformed or is deformed only by a maximum of 5% of its height perpendicular to the sealing plane.

4. The system as claimed in claim 1, wherein, in a radial cross section of the sealing embossment, the inner flank has a rectilinear contact region which extends between the flange and the transition region.

5. The system as claimed in claim 4, wherein the rectilinear contact region has a length of 0.1 to 1.5 millimeters.

6. The system as claimed in claim 4, wherein the portion capsule has a radius of 0.05 to 0.5 millimeters in a transition from the rectilinear contact region to the transition region.

7. The system as claimed in claim 1, wherein the portion capsule has a radius of 0.05 to 0.5 millimeters in a transition from the outer flank to the transition region.

8. The system as claimed in claim 1, wherein a height of the sealing embossment perpendicular to the sealing plane ranges between 0.2 and 1 millimeter.

9. The system as claimed in claim 8, wherein the sealing embossment is designed such that, in an event of an exertion of force of up to 100 N on the sealing embossment perpendicular to the sealing plane, the sealing embossment is not deformed or is deformed only by a maximum of 0.2 millimeters of its height perpendicular to the sealing plane.

10. The system as claimed in claim 1, wherein the sealing embossment, at a middle of its height, has a width between 0.2 and 1 millimeter.

11. The system as claimed in claim 1, wherein the sealing embossment has an average material thickness between 0.05 and 0.3 millimeters.

12. The system as claimed in claim 1, wherein, in a radial cross section of the sealing embossment, the transition region has a rectilinear connecting region which has a width of between 0.3 and 1.2 millimeters.

13. The system as claimed in claim 1, wherein the portion capsule has a radius of 0.05 to 0.5 millimeters in a transition from the outer flank to the flange region running parallel to the sealing plane.

14. The system as claimed in claim 1, wherein the portion capsule has a flange region, which extends parallel to the sealing plane, between the bead and the outer flank, and wherein the portion capsule has a flange intermediate region which extends between the inner flank and the capsule wall, wherein the flange region and the flange intermediate region are situated at a same height along a vertical direction perpendicular to the sealing plane.

15. The system as claimed in claim 1, wherein the portion capsule has a radius of 0.08 to 0.5 millimeters in a transition from the inner flank to a flange intermediate region which extends between the sealing embossment and the capsule wall.

16. The system as claimed in claim 1, wherein the portion capsule has a flange intermediate region which extends between the inner flank and the capsule wall, wherein the flange intermediate region is curved.

17. The system as claimed in claim 16, wherein a curvature of the flange intermediate region has a radius between 0.1 and 1 millimeter.

18. The system as claimed in claim 1, wherein, in a radial cross section of the sealing embossment, the outer flank has a rectilinear flank section which comprises a length between 0.2 and 1 millimeter.

19. The system as claimed in claim 1, wherein, in a radial cross section, an extent of the sealing plane between the outer flank and the bead comprises a length between 0.3 and 1.5 millimeters.

20. The system as claimed in claim 1, wherein the bead protrudes over the flange over a top side which forms the sealing plane.

21. The system as claimed in claim 1, wherein the bead protrudes from the flange over a bottom side which faces away from the sealing plane, wherein the flange, on the bottom side, projects from the flange to a lesser extent than the sealing embossment, and/or wherein the bead protrudes over the flange to a lesser extent on the top side than on the bottom side.

22. The system as claimed in claim 1, wherein the bead is formed by rolling-up of a flange edge, wherein the flange edge is rolled up in the direction of the capsule base.

23. The system as claimed in claim 12, wherein the rectilinear connecting region has a width of between 0.6 and 0.8 millimeters.

24. The system as claimed in claim 1, wherein, in the edge region, there is formed a sealing contour for sealing engagement with the sealing embossment, wherein the sealing contour comprises an encircling depression and an encircling sealing lug formed adjacent to the depression, wherein the depression is arranged outside the sealing lug in a radial direction, and wherein an outer sealing lug flank forms an inner wall of the depression.

25. The system as claimed in claim 24, wherein, in the closed position, the sealing lug engages into the flange intermediate region and the sealing embossment engages into the depression such that the sealing lug flank together with the inner flank form linear or punctiform contact in radial cross section.

26. The system as claimed in claim 25, wherein, in the closed position, the sealing embossment is not deformed or is deformed by the sealing contour only by a maximum of 5% of its height perpendicular to the sealing plane.

27. The system as claimed in claim 24, wherein the sealing contour has a further encircling sealing lug, wherein the depression is arranged between the sealing lug and the further sealing lug in the radial direction, wherein the sealing lug is formed so as to be longer than the further sealing lug, and wherein, in the closed position, the further sealing lug forms punctiform contact with the outer flank in radial cross section.

* * * * *